United States Patent [19]

Ohnsorg

[11] 4,233,256

[45] Nov. 11, 1980

[54] PROCESS FOR INJECTION MOLDING SINTERABLE CARBIDE CERAMIC MATERIALS

[75] Inventor: Roger W. Ohnsorg, Niagara Falls, N.Y.

[73] Assignee: The Carborundum Company, Niagara Falls, N.Y.

[21] Appl. No.: 970,702

[22] Filed: Dec. 18, 1978

Related U.S. Application Data

[62] Division of Ser. No. 864,415, Dec. 27, 1977, Pat. No. 4,144,207.

[51] Int. Cl.$^3$ ................ C04B 33/32; C04B 35/64
[52] U.S. Cl. ................ 264/44; 264/29.5; 264/29.7; 264/63; 264/66; 264/328.1; 264/331
[58] Field of Search ................ 264/61, 66, 63, 331, 264/41, 44, 328, 332, 29.5, 29.7

[56] References Cited

U.S. PATENT DOCUMENTS

| | | | |
|---|---|---|---|
| 2,938,807 | 5/1960 | Andersen | 264/63 |
| 3,549,736 | 12/1970 | Waugh | 264/63 |
| 3,796,564 | 3/1974 | Taylor | 264/63 |
| 3,882,210 | 5/1975 | Crossley | 264/63 |
| 4,041,117 | 8/1977 | Prochazka | 264/63 |
| 4,124,667 | 11/1978 | Coppola et al. | 264/63 |

*Primary Examiner*—Donald J. Arnold
*Attorney, Agent, or Firm*—David E. Dougherty; Raymond W. Green; Donald C. Studley

[57] ABSTRACT

Ceramic compositions that may be injection molded and subsequently sintered are described. A particulate ceramic material, such as silicon carbide, is coated with a mixture of thermoplastic resin and oils or waxes, and utilized as a feed material in an injection molding process. The molded product may subsequently be sintered at 2000° C. to 2200° C. to produce a hard, dense article.

7 Claims, No Drawings

PROCESS FOR INJECTION MOLDING SINTERABLE CARBIDE CERAMIC MATERIALS

This is a division of copending application Ser. No. 864,415, filed Dec. 27, 1977, now U.S. Pat. No. 4,144,207.

BACKGROUND OF THE INVENTION

The present invention relates to injection molding of ceramic articles and, in particular, to the production of dense, hard articles having industrial uses. Although the present invention will be discussed in regard to compositions containing silicon carbides as the ceramic material, it will be understood that other sinterable metal carbides, for example, titanium carbide, may be utilized as the ceramic material.

Silicon carbide has long been known for its hardness, strength, and excellent resistance to oxidation and corrosion. Silicon carbide has a low coefficient of expansion, good heat transfer properties, and maintains high strength at elevated temperatures. In recent years, the art of producing high-density silicon carbide materials by sintering silicon carbide powders has been developed. High-density silicon carbide materials find utility in the fabrication of components for turbines, heat exchange units, pumps, and other equipment or tools that are exposed to severe corrosion or wear, especially in operations carried out at high temperatures. The present invention relates to sinterable metal carbide compositions which may be injection molded and subsequently sintered to produce high-density products. The present invention further relates to the use of silicon carbide as the ceramic material and, in particular, to ceramic compositions containing predominantly the alpha crystalline form of silicon carbide.

Ceramic bodies or compacts may be formed by various processes, for example, by slip casting, by pressing a green body followed by sintering, or by hot pressing, and subsequently shaping or machining of the sintered body to produce the finished product. Injection molding is a process wherein a moldable composition is forced into a mold or die. Injection molding allows molding of complex shapes. The injection molding process facilitates a rapid and repeated forming of a plurality of articles having a consistent shape with close dimensional tolerance. The injection molding process minimizes the amount of shaping or machining that may be required to produce a finished article. Injection molding of the present ceramic compositions may be carried out by either the transfer method or by the direct injection method utilizing known injection molding techniques.

Many problems are encountered in injection molding of ceramic materials, especially if particulate silicon carbide is utilized as the ceramic material. The irregularly shaped particles tend to pack as pressure is applied; ceramic materials have an innate resistance to flow. The packing of such materials in pressing or molding operations frequently causes internal stresses in the pressed or molded article which lead to consequent failure of the finished product. The abrasive properties of the ceramic material must be considered, as material itself rapidly wears away all surface with which the ceramic particles come in contact. Repeated use of ceramic materials, especially those containing silicon carbide, is extremely detrimental to the mold or die surface against which it is forced. Such wear soon makes the mold less accurate, and additional finishing steps are required to obtain and maintain close tolerances in the molded articles. Thus, injection molding of ceramic materials, such as silicon carbide, has not been deemed heretofore to be economically feasible.

GENERAL DESCRIPTION OF INVENTION

It has now been found that compositions containing a sinterable ceramic material may be injection molded. In general, the compositions of the present invention contain from about 70 to about 86 percent by weight of a ceramic material, such as silicon carbide; the remainder of the composition comprises sintering aids, a thermoplastic resin material, oil or wax having a vaporizing point less than that of the thermoplastic resin material, and, preferably, a lighter, more volatile oil. The light oil may be animal, vegetable, or mineral. The composition may also contain excess carbon or a source of excess carbon that will facilitate a subsequent sintering operation. The components are admixed and formed into an article by known injection molding techniques. The formed article is then baked at temperatures up to about 1000° C. preferably in a non-oxidizing environment to remove the resins, waxes, and oil, but to prevent or inhibit the removal of the residual or char carbon from a carbon source material. The article is then sintered at temperatures between about 2000° C. and 2200° C. The sintered product is of high density and is substantially free of internal stresses. The sintered product retains the shape originally molded but reduced in volume by known and predictable shrinkage which takes place during sintering.

DETAILED DESCRIPTION OF THE INVENTION

The present invention relates to ceramic compositions that may be injection molded and subsequently sintered, and to the process of producing a dense sintered body or article utilizing such compositions. For the purpose of clarity, the detailed description is divided into two main sections. One section with appropriate subsections relates to components of the composition. The second section and appropriate subsections relate to the steps in the process utilized to produce a sintered product that has been injection molded.

I. COMPOSITION COMPONENTS

A. Ceramic Material

The ceramic material comprises at least about 65 percent and usually from about 70 to about 86 percent by weight of the composition. A range of from about 72 to about 84 percent by weight is eminently useful, and, within this range, from about 76 to about 80 percent by weight has been found to be especially adapted to use. Generally, loadings of less than about 70 percent by weight do not produce a final sintered product of the desired density, and loadings greater than about 86 percent by weight are injection molded only with difficulty.

The ceramic material utilized in the present invention is preferably utilized in finely divided form. The preferred material has an average size from about 0.10 to about 2.00 microns, with a maximum size of about 5.00 microns. Although size is a critical parameter, surface areas is equally of relevant consideration in determining the suitable material. Accordingly, the preferred silicon carbide particles as used in the present composition have a surface area of from about 1 to about 100 m$^2$/g.

Within this range, it is more preferred that the surface area of particles range between about 5 and about 20 m²/g. Particles with a surface area in this latter range have been found eminently useful in producing the compositions of the present invention.

Silicon carbide is a preferred ceramic material. The silicon carbide may be either alpha or beta phase or may be amorphous. At the present time, the alpha (noncubic) crystalline phase of silicon carbide is most economically obtained. The present compositions may contain substantially entirely, e.g., 95 percent or more by weight, silicon carbide of the alpha phase, or may contain mixtures of the various forms of silicon carbide. For example, mixtures which are predominantly alpha phase (greater than 50 percent) are aptly suited to use. The ceramic material may contain minor amounts of impurities without deleterious effect; generally, a purity of about 95 percent is required and a higher purity desired.

B. Sintering Aids

Materials which react with the ceramic material at sintering temperatures to form a sintered product are utilized as sintering aids. Materials containing carbon, beryllium, nitrogen, or boron are examples of such aids. More specifically, from about 0.2 to about 5.0 percent by weight of boron or beryllium or mixtures thereof are useful as sintering aids, and, within that range, from about 0.5 to about 4.0 percent by weight of the aid has been found aptly suited to use. Elemental boron or beryllium, compounds of boron or beryllium, or mixtures thereof are suitable sources of boron and beryllium. Nitrides and carbides of boron and beryllium are eminently useful as sintering aids.

C. Carbon

The present compositions contain excess carbon in amounts of from about 0.05 to about 5.0 percent by weight of the composition after baking. Excess carbon is free or uncombined carbon which remains in the composition after baking. Excess carbon in amounts of from about 1.0 to about 4.0 percent by weight are useful, and, within this range, amounts of from about 1.0 to about 1.5 percent by weight are eminently useful. Excess carbon is an aid in sintering and has been found to be beneficial in reducing the amounts of various oxides and other impurities in the starting ceramic material that otherwise would remain in the finished product. In accord with the present invention, the excess carbon required may suitably be supplied by char or residue from an organic material. The char value or the carbon that will be added by the char of the organic material may be calculated. Usually, from about 35 to about 85 percent, and, generally, about 50 percent of the total calculated char value will remain after the baking step to be available as excess carbon.

Thermosetting resin materials are useful sources of char. For example, epoxy resins and phenol-formaldehyde resins, either resole or novolac, are readily available and suited to use. A particularly good carbon source material is polyphenylene resin. Polyphenylene resin has been found to have good mixing characteristics, no adverse effect on injection molding operations, and excellent char yield in the range of 80 percent. Polyphenylene resin materials are available from Hercules, Incorporated, Wilmington, Delaware.

Thermoplastic resin materials are generally not useful sources of char because of their relatively low char yields. Usually, such materials volatilize at the baking temperatures of the present invention and contribute little if any of the required carbon char.

The carbon source material may be added by merely mixing it with the silicon carbide starting material. For example, powdered phenol-formaldehyde resin may be admixed with the silicon carbide starting material to provide the required excess carbon. A solvent containing the dissolved resin may be mixed with the silicon carbide starting material, the solvent evaporated, leaving a coated silicon carbide product. Suitably, the resin-silicon carbide mixture is wet milled, dried, granulated, baked, and dry milled to insure an intimate mixture.

D. Injection Molding Additives

1. Thermoplastic Resin

One of the components of the present composition is a thermoplastic resin. Although other resins may be adapted to use, thermoplastic resins are preferable as they can be readily molded into intricate shapes, they have good storage properties, and the sprues and runners from the injection molding process may be remixed in new batches without loss of material. One of the purposes of the resin is to substantially coat the particulate ceramic material. The resin coating on the particles affords protection for the equipment through which the ceramic mixture is passed. One of the principal purposes of the resin is to hold the particles together in a mass so that, after molding, the formed body is sufficiently bonded together to closely maintain its molded shape. Thermoplastic resins, such as acrylic, ethyl cellulose, ABS, hydroxypropyl cellulose, high and low density polyethylene, oxidized polyethylene, cellulose acetate, nylon, ethylene acrylic acid copolymer, cellulose acetate butyrate, polystryenes, polybutylene, polysulfone, polyethylene glycol, and polyethylene oxide are examples of useful resins. Styrene resin, such as plasticized polystyrene, has been found to be particularly adapted to use. Amounts of resin between about 9 and about 17 percent by weight of the composition have been found eminently suited to use. Volatilization temperature of the resin component is also important, and volatilization temperatures between about 100° C. and about 500° C. are preferred. Thermoplastic resins having volatilization temperatures of between about 200° C. and about 400° C. are found especially useful. Thus, the resin component must be chosen to have the ability to coat the particles, hold the particles together after the injection molding step, and to volatilize in the desired temperature range. Plasticized styrene, polystyrene, and related styrene resins are excellently suited to use in the present invention. Compositions containing styrene resins also have good mold release characteristics which are not found in all thermoplastic resins.

2. Wax or High Temperature Volatilizing Oil

The present compositions also contain a wax or high temperature volatilizing oil. The wax or oil preferably has a volatilizing point between about 150° C. and about 190° C. The volatilizing point of this component is below the resin component discussed above. This component may also be a lubricant, for example, fatty acids, such as stearic acid, fatty acid esters, and hydrocarbon waxes. Ranges from about 2.0 to about 3.5 percent by weight of the composition have been found useful. Examples are paraffin, mineral oils, vegetable oils, and waxes.

3. Low Temperature Volatilizing Hydrocarbon or Oil

If desired, the present compositions may also contain a lower temperature volatilizing hydrocarbon or oil. This component has a vaporizing point between about 50° C. and about 150° C. This component may be animal, vegetable, or mineral and has a vaporizing point below that of the wax or high temperature volatilizing oil component. Amounts of this component between about 4.5 and about 8.5 percent by weight of the composition have been found useful. Examples of useful low temperature volatilizing materials are light mineral and vegetable oils.

4. Lubricant or Mold Release Agent

A minor amount, generally from about 1 to about 3 percent by weight of the composition of a lubricant or mold release material has been found useful in some cases. This component is optional and may not be needed because of the lubricating characteristics of the other injection molding additives. Preferably, the lubricant is a fatty or waxy material that aids in protecting the equipment from the abrasive ceramic material and also aids in release of the article from the mold. Examples of lubricants are fatty acids, fatty alcohols, fatty esters, and hydrocarbon waxes.

II. PROCESS

A. Mixing

The main objective of mixing is to obtain a thoroughly homogeneous mixture of the components. The order in which the components are mixed is not important as long as a homogeneous mixture is obtained for the molding step. For example, the ceramic material and the sintering aid may initially be mixed together, either dry or wet milled. If wet milled, the mixture is suitably dried, granulated, baked and dry milled. The injection molding additives may then be added, and the resulting mixture is preferably heated during a subsequent mixing step. The mixing of the ceramic material and the injection molding additives may suitably be mixed in a heated sigma blade mixer. A mixing time of about one hour is usually found to give a good mixture. Preferably, before the mixture is utilized in the molding operation, it is screened to yield a mixture having a more consistent particle size. Generally, a mixture passing a 6 USS mesh screen followed by pelletizing produces a feed material that is eminently useful in the molding step.

B. Molding

The molding step is accomplished by known injection molding techniques. Injection molding operations are usually carried out utilizing the transfer method or the direct injection method. In the transfer method, a hydraulic press is utilized to force the material from a heated storage chamber, by means of a plunger, through sprues or runners, into a mold. Molding pressure is based upon the area of the plunger in the storage chamber and usually requires at least about 2,500 psi to force the present mixture into a mold; more commonly, pressures ranging from about 4,500 to about 9,000 psi are used. In the direct injection method, the heated mixture is forced directly into the mold by either a hydraulic press, through runners and gates, or by reciprocating screw equipment. Either method may be utilized.

In either method, the mixture to be molded is fed into the injection molding die with sufficient heat and pressure to force the mixture to flow into all areas of the die. A temperature slightly higher than the melting point of the thermoplastic resin/wax/oil mixture is usually utilized. Temperatures in the range of from about 130° C. to about 170° C. are generally useful. A pressure sufficient to flow the present mixtures into a mold is required. Pressures in the range of from about 4,500 to about 9,000 psi are usually sufficient.

The residence time in the mold varies from about 1 to about 60 seconds, depending upon the temperature of the mold and the size of the article to be molded. When the mold is maintained at ambient temperature, a residence time between about five and about sixty seconds usually produces a full and firm molded article.

C. Baking

After removal of the article from the mold, the article is baked. The baking process is preferably carried out under non-oxidizing conditions in an atmosphere of nitrogen, argon or other gas inert to the molded product. During the baking process, the thermoplastic resin component is volatilized, and the carbon source material is converted to residual carbon or char dispersed throughout the article. Although there is a loss of some carbon by vaporization in the baking atmosphere, usually from about 35 to about 85 percent of the carbon from the carbon source material is retained within the article during the baking step. Phenol-formaldehyde resin materials usually have a carbon char value of about 35 to about 50 percent. Polyphenylene resin has a char value in the range of 80 percent. Baking temperatures are usually in the range from about 450° C. to about 1000° C., and a range from about 700° C. to about 900° C. has been found eminently useful. The baking time depends upon the size and volume of the molded article and is best extended to insure that no blistering, slumping, or cracking occur in the article. Starting at room temperature of about 20° C., the temperature is raised in increments of about 5° C. per hour, or slightly higher, depending upon the size of the article, to a final baking temperature of about 800° C. Baking times usually range from about five days to about two weeks. The product of the baking step is a porous, shaped article containing the ceramic material, sintering aid; and excess carbon.

D. Sintering

The product from the baking step is next sintered to obtain the final product. The baking step and the sintering step may be carried out in a common furnace; however, because of the rather large difference in the temperature ranges of the two steps, they are preferably carried out in separate furnaces. The sintering step is carried out by known sintering methods and techniques.

The sintering operation is preferably carried out in a vacuum or inert gas such as nitrogen or argon. The article is sintered at temperatures between about 2000° C. and about 2200° C. The sintering time is usually between about 20 minutes and one hour at such temperatures. Preferably, the sintering operation is carried out in increments, for example, a heating to about 1500° C. over a period of about 4 hours, and 300° C. per hour increase to the final sintering temperature.

The sintered product is free of exaggerated grain structure and internal strains. Although the sintered product will have a smaller volume than the molded body, such shrinkage is accurately predictable.

E. Finishing

If desired, the sintered product may be finished to even a higher degree of tolerance by machining, for example, by diamond grinding, electrochemical machining, ultrasonic machining, or by electrical discharge machining techniques, to produce tools or articles requiring extremely close tolerances.

The following examples are illustrative and are not to be interpreted as limiting of the present invention. Unless otherwise noted, parts are in parts by weight, and temperatures are in degress Celsius.

EXAMPLE I 78.00 parts of alpha phase silicon carbide having a particle size of about 1 micron were mixed with about 0.50 parts of finely divided $B_4C$ (sufficient to provide about 0.50% by weight boron to the silicon carbide). The resulting mixture was placed in a ball mill and milled for about 24 hours. The mixture was then placed in a high shear, closed, overlapping sigma blade mixer with about 2.04 parts of powdered phenolic resin (sufficient to provide about 1.00% by weight of carbon char). The mixture was steam heated to about 121° during mixing. 27.00 parts of a mixture comprised of 58% by weight of styrene resin having a molecular weight of between the 800 and 5,000, 12% vegetable oil having a melting point of about 55° to about 60°, and 30% light mineral oil were then added to the mixer and the temperature raised to about 150°. Mixing was continued for about one hour. The resultant mixture was allowed to cool, granulated and screened. The screened material, passing a USS 6 mesh screen was pelletized and utilized as feed material for injection molding.

The injection molding operation was carried out using plunger-type molding equipment. The barrel temperature was maintained at about 150° and the mold maintained at room temperature. A pressure of 6,750 psi was utilized with a mold time of two seconds. The molded product was full and firm upon ejection. The molded product was then baked in a nitrogen atmosphere at a rate of about 3.75° per hour to a temperature of about 450°. Temperature increments were then increased to about 7.50° per hour, and heating continued until a temperature of about 800° was reached. The product was then allowed to cool.

The cooled product was then placed in an induction furnace and, using an argon atmosphere, heated over a period of four hours to 1500°. The temperature was then raised 300° per hour to 2160° and maintained at 2160° for about one hour. The resultant sintered product was found to be substantially free of exaggerated grain structure. The linear shrinkage was found to be about 18%. The density of the product was found to be 3.19 $g/cm^3$, about 99% of theoretical.

EXAMPLE II 79.00 parts of a blend of alpha phase silicon carbide was mixed with about 0.51 part of finely divided $B_4C$ and about 0.97 part of polyphenylene polymer (sufficient to provide about 1.00% by weight of carbon char) dissolved in acetone. The resulting mixture was then milled, the acetone evaporated, and the mixture dried at about 50°. The coated particles were then granulated and milled. The coated silicon carbide mixture was then placed in a sigma blade mixer as in Example I and mixed with 16.76 parts hydroxyporpyl cellulose, 4.06 parts polyalkylene glycol, and 0.68 part zinc stearate. The resulting mixture was injection molded, baked and sintered, following the procedure of Example I. This mixture was found to be slightly less plastic in processing than the mixture of Example I. The density of the sintered article was found to be 3.13 $g/cm^3$, about 97.5% of theoretical.

EXAMPLE III 77.50 parts of a blend of alpha phase silicon carbide were mixed with about 0.50 part of finely divided $B_4C$ and about 2.03 parts of phenol-formaldehyde resin dissolved in acetone. The acetone was then evaporated and the mixture dried at about 50°. The coated particles were then granulated and milled. The coated silicon carbide mixture was then placed in a sigma blade mixer as in Example I and mixed with 19.00 parts hydroxypropyl cellulose and 3.50 parts stearic acid. The mixture was then processed following the procedure of Example I. After sintering, the product was found to have a density of 3.13 $g/cm^3$, about 97.5% of theoretical.

What is claimed is:

1. A process for producing a sintered carbide ceramic article comprising the steps of:
   a. forming a homogeneous mixture containing from about 65 to about 86 percent by weight of a sinterable carbide ceramic material; from about 0.2 to about 0.5 percent by weight of a sintering aid of boron or beryllium selected from the group of elemental beryllium, beryllium compounds, elemental boron, boron compounds, or mixtures thereof; from about 14 to about 30 percent by weight of a mixture of thermoplastic resin and at least one oil or wax having a lower volatilizing temperature than said resin; and a carbon source material sufficient to provide from about 0.5 to about 5.0 percent by weight excess carbon,
   b. injection molding said mixture to produce a molded product,
   c. removing said thermoplastic resin by baking said molded product at a temperature between about 450° C. and about 1000° C. to produce a porous baked product, consisting of ceramic material, sintering aid and excess carbon,
   d. sintering said baked product at a temperature between about 2000° C. and about 2200° C. to produce a sintered product.

2. The process of claim 1 wherein the sinterable carbide ceramic material is silicon carbide.

3. The process of claim 2 wherein the silicon carbide is predominantly alpha phase.

4. The process of claim 2 wherein the silicon carbide is substantially entirely alpha phase.

5. The process of claim 1 wherein the sintering aid contains boron.

6. The process of claim 1 wherein the sintering aid is boron carbide.

7. The process of claim 1 wherein the mixture includes a second oil or wax component volatilizing at a temperature below said thermoplastic resin, one of said oil or wax components having a lower volatilizing temperature than the other.

* * * * *